(12) United States Patent
Cai

(10) Patent No.: US 9,596,009 B2
(45) Date of Patent: Mar. 14, 2017

(54) MULTICAST CONTROL CHANNEL DESIGN

(75) Inventor: Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 524 days.

(21) Appl. No.: 11/737,984

(22) Filed: Apr. 20, 2007

(65) Prior Publication Data

US 2008/0259842 A1 Oct. 23, 2008

(51) Int. Cl.
| | | |
|---|---|---|
| *H04W 72/00* | (2009.01) | |
| *H04B 7/00* | (2006.01) | |
| *H04B 7/204* | (2006.01) | |
| *H04B 7/212* | (2006.01) | |
| *H04W 4/00* | (2009.01) | |
| *H04B 7/02* | (2006.01) | |
| *H04W 48/12* | (2009.01) | |

(52) U.S. Cl.
CPC .......... *H04B 7/022* (2013.01); *H04W 72/005* (2013.01); *H04W 48/12* (2013.01)

(58) Field of Classification Search
CPC ........................ H04W 72/042; H04W 72/0453
USPC ....... 370/204, 312, 319, 321, 328, 329, 341, 370/343, 347, 348; 455/450, 451, 452.1, 455/509
See application file for complete search history.

(56) References Cited

U.S. PATENT DOCUMENTS

| 5,404,355 | A | 4/1995 | Raith | |
|---|---|---|---|---|
| 2003/0194992 | A1* | 10/2003 | Kim et al. | 455/414.1 |
| 2003/0207696 | A1 | 11/2003 | Willenegger et al. | |
| 2004/0116139 | A1 | 6/2004 | Yi et al. | |
| 2005/0041681 | A1 | 2/2005 | Lee et al. | |
| 2005/0043035 | A1 | 2/2005 | Diesen et al. | |

(Continued)

FOREIGN PATENT DOCUMENTS

| CN | 1463103 A | 12/2003 |
|---|---|---|
| EP | 1353523 A1 | 10/2003 |

(Continued)

OTHER PUBLICATIONS

3GPP TSG-RAN WG RAN1#46; Inter E-Node B Node Synchronization in LTE MBMS; Alcatel Shanghai Bell; R1-061969; Tallinn, Estonia; Aug. 28-Sep. 1, 2006; 4 pgs.

(Continued)

*Primary Examiner* — Dung Hong
(74) *Attorney, Agent, or Firm* — Conley Rose, P.C.; J. Robert Brown, Jr.

(57) ABSTRACT

A system for providing a multicast control channel (MCCH) including information related to a service is provided. The system includes a processor programmed to promote transmission of a MCCH including a multi-cell information portion that contains information common to a plurality of cells in a wireless telecommunications network, and a cell-specific information portion that contains information specific to one of the cells. A method for providing control information is also provided. The method includes transmitting a multicast control channel (MCCH) including information related to a service, wherein the MCCH has a cell-specific portion that contains information specific to a specific cell in a telecommunications network, and wherein the MCCH has a multi-cell portion that contains information common to a plurality of cells in the telecommunications network.

19 Claims, 6 Drawing Sheets

(56) References Cited

U.S. PATENT DOCUMENTS

| | | | |
|---|---|---|---|
| 2005/0070277 A1* | 3/2005 | Hu | 455/432.3 |
| 2005/0107036 A1* | 5/2005 | Song | H04L 1/0009 |
| | | | 455/23 |
| 2005/0165945 A1 | 7/2005 | Lee et al. | |
| 2006/0050718 A1 | 3/2006 | Corson et al. | |
| 2006/0067281 A1* | 3/2006 | Kwak | H04W 76/002 |
| | | | 370/337 |
| 2006/0189272 A1 | 8/2006 | Willenegger et al. | |
| 2007/0047493 A1* | 3/2007 | Park et al. | 370/331 |
| 2007/0167181 A1* | 7/2007 | Ramesh | H04W 48/12 |
| | | | 455/502 |
| 2007/0189236 A1* | 8/2007 | Ranta-aho | H04W 72/048 |
| | | | 370/335 |
| 2008/0031245 A1* | 2/2008 | Pekonen | 370/390 |
| 2008/0045224 A1* | 2/2008 | Lu | H04W 72/005 |
| | | | 455/446 |
| 2010/0189026 A1 | 7/2010 | Lee et al. | |

FOREIGN PATENT DOCUMENTS

| | | |
|---|---|---|
| EP | 1501328 A2 | 1/2005 |
| EP | 1513368 A2 | 3/2005 |
| EP | 1796404 A1 | 6/2007 |
| EP | 1804529 A1 | 6/2008 |
| GB | 2412040 A | 9/2005 |
| WO | 2004068884 A1 | 8/2004 |
| WO | 2004102878 A1 | 11/2004 |
| WO | 2005067175 A1 | 7/2005 |
| WO | 2005078962 A1 | 8/2005 |
| WO | 2005078963 A1 | 8/2005 |
| WO | 2006088301 A1 | 8/2006 |
| WO | 2007078164 A1 | 7/2007 |
| WO | 2007092691 A2 | 8/2007 |

OTHER PUBLICATIONS

3GPP TSG-RAN WG RAN3#53; Synchronization Requirements for MBMS RF Combining in LTE SFN; Alcatel Shanghai Bell; R3-061007; Tallinn, Estonia; Aug. 28-Sep. 1, 2006; 3 pgs.
3GPP TSG-RAN Meeting #33; MBMS Transmissions & Synchronization Requirements; Motorola, Nokia; RP-060629; Palms Spring, USA; Sep. 19-22, 2006; 7 pgs.
3GPP TSG-RAN-WG2 Meeting #53; Centralized Function for LTE MBMS; Motorola; R2-061350; Shanghai, China; May 8-12, 2006; 4 pgs.
3GPP TSG-RAN WG 3 Meeting #53bi5; Architecture for Content Synchronisation; Alcatel; Seoul, Korea; Oct. 10-13, 2006; 5 pgs.
PCT International Search Report; PCT Application No. PCT/U52008/060457; Jan. 5, 2009; 7 pgs.
PCT Written Opinion of the International Searching Authority; PCT Application No. PCT/U52008/060457; Jan. 5, 2009; 12 pgs.
3GPP TSG RAN WG2; Motorola; Title: "MBMS Modulation and Coding State Selection"; R2-061985; Cannes, France; Jun. 27-30, 2006; 6 pgs.
PCT Invitation to Pay Additional Fees (Partial PCT Search Report); PCT Application No. PCT/U52008/060457; Sep. 17, 2008; 8 pgs.
Foreign communication from a related counterpart application—European Search Report, EP 07 10 9016, Dec. 20, 2007, 7 pages.
3GPP TSG RAN WG2#58bis; Nortel; Title: Hierarchical MCCH; R2-072477; Orlando, Florida; Jun. 25-29, 2007; 4 pgs.
3GPP TSG-RAN WG2#57bis; Nokia, Siemens Networks; Title: MCCH Control; R2-071246; St. Julian's, Malta; Mar. 26-30, 2007; 6 pgs.
3GPP TSG-RAN WG3 Meeting #53bis; Title: Architecture for Content Synchronisation; R3-061534; Alcatel; Seoul, Korea; Oct. 10-13, 2006; 5 pgs.
Foreign communication from a related counterpart application—Second European Search Report, EP 07 10 9016, Sep. 15, 2008, 3 pages.
PCT International Preliminary Report on Patentability; PCT Application No. PCT/US2008/060457; Aug. 14, 2009; 14 pgs.
Foreign communication from a related counterpart application—Extended European Search Report, EP Application No. 10184706.9-2412, Dec. 8, 2010, 6 pages.
PCT International Preliminary Report on Patentability; PCT Application No. PCT/CA2007/002035; Mar. 18, 2010; 8 pgs.
PCT International Search Report; PCT Application No. PCT/CA2007/002083; May 23, 2008; 3 pgs.
PCT Written Opinion of the International Searching Authority; PCT Application No. PCT/CA2007/002083; May 23, 2008; 5 pgs.
PCT International Preliminary Report on Patentability; PCT Application No. PCT/CA2007/002083; Sep. 24, 2009; 10 pgs.
EP Search and Examination Report; EP Patent Application No. 07845553.2; Oct. 7, 2010; 9 pgs.
Office Action mailed Oct. 14, 2010; U.S. Appl. No. 11/938,000, filed Nov. 9, 2007; 20 pgs.
Cai, Zhijun; U.S. Appl. No. 11/931,710; Titled: "Multicast/Broadcast Single Frequency Network Control Information Transmission", filed Oct. 31, 2007.
Cai, Zhijun; U.S. Appl. No. 11/938,000; Titled: "Indication of Multicast Control Information", filed Nov. 9, 2007.
Office Action mailed Mar. 11, 2011; U.S. Appl. No. 11/931,710, filed Oct. 31, 2007; 25 pages.
PCT International Search Report; PCT Application No. PCT/CA2007/002035; May 9, 2008; 5 pgs.
PCT Written Opinion of the International Searching Authority; PCT Application No. PCT/CA2007/002035; May 9, 2008; 6 pgs.
3GPP TR 25.813 v7.1.0; Technical Specification Group Radio Access Network; Evolved Universal Terrestrial Radio Access and Evolved Universal Terrestrial Radio Access Network; Radio Interface Protocol Aspects; Sep. 2006; 41 pgs.
3GPP TR 25.814 v7.1.0; Technical Specification Group Radio Access Network; Physical Layer Aspects for Evolved Universal Terrestrial Radio Access; Sep. 2006; 132 pgs.
3GPP TS 36.300 v8.3.0; Technical Specification Group Radio Access Network; Evolved Universal Terrestrial Radio Access and Evolved Universal Terrestrial Radio Access Network; Overall Description—Stage 2; Dec. 2007; 121 pgs.
3GPP TSG-RAN WG2 Meeting #59; "On the MCCH Design;" Research In Motion Limited; R2-073250; Athens, Greece; Aug. 20-24, 2007; 4 pgs.
European Examination Report; EP Application No. 07845505.2; Aug. 10, 2011; 5 pgs.
Office Action mailed Sep. 1, 2011; U.S. Appl. No. 11/931,710, filed Oct. 31, 2007; 18 pgs.
U.S. Office Action mailed Oct. 7, 2010; U.S. Appl. No. 11/931,710, filed Oct. 31, 2007; 16 pgs.
Nokia Siemens Networks, Nokia; 3GPP TSG-RAN WG2 Meeting #59; Title: "MCCH Hierarchy and Transmission Modes"; R2-073082; Athens, Greece; Aug. 20-24, 2007; 5 pgs.
Nokia Siemens Networks, Nokia; 3GPP TSG-RAN WG2 Meeting #59; Title: "MCCH Content and Transmission"; R2-073086; Athens, Greece, Aug. 20-24, 2007; 5 pgs.
Alcatel-Lucent; 3GPP RAN WG2#59; Title: "MCCH Channel Design"; R2-073132; Athens, Greece, Aug. 20-24, 2007; 4 pgs.
Panasonic; 3GPP TSG RAN WG2 #59; Title: "MCCH Structure and Transmission in LTE"; R2-073267; Athens, Greece, Aug. 20-24, 2007; 3 pgs.
LG Electronics; 3GPP TSG-RAN WG2 #59; Title: "LTE MCCH Structure and Transmission"; R2-073363; Athens, Greece; Aug. 20-24, 2007; 3 pgs.
European Seach and Examination Report; EP Application No. 07845505.2; Oct. 27, 2010; 8 pgs.
European Summons to Attend Oral Proceedings Pursuant to Rule 115(1) EPC; European Application No. 07109016.1, Dec. 14, 2010; 4 pgs.
Chinese Office Action; Application No. 200780101350.5; Sep. 5, 2012; 9 pages.
European Examination Report; Application No. 10184706.9; Apr. 17, 2012; 4 pages.
European Examination Report; Application No. 07845505.2; Mar. 6, 2012; 5 pages.

(56) References Cited

OTHER PUBLICATIONS

Canadian Office Action; Application No. 2,686,544; Jun. 4, 2012; 3 pages.
Chinese Office Action; Application No. 20880012866.7; Jun. 4, 2012; 18 pages.
Canadian Office Action; Application No. 2,698,023; Apr. 17, 2013; 7 pages.
Chinese Office Action; Application No. 200780101350.5; Apr. 3, 2013; 8 pages.
Chinese Office Action; Application No. 20880012866.7; Feb. 4, 2013; 10 pages.
European Examination Report; Application No. 07845505.2; Feb. 22, 2013; 5 pages.
Indian Office Action; Application No. 6210/CHENP/2009; Dec. 15, 2014; 2 pages.
Cai, Zhijun; U.S. Appl. No. 14/965,126, filed Dec. 10, 2015; Title: "Multicast/Broadcast Single Frequency Network Control Information Transmission"; 17 pages.
Chinese Office Action; Application No. 20880012866.7; Oct. 21, 2013; 7 pages.
Office Action dated Aug. 16, 2013; U.S. Appl. No. 11/931,710, filed Oct. 31, 2007; 37 pages.
Notice of Allowance dated Oct. 8, 2013; U.S. Appl. No. 11/931,710, filed Oct. 31, 2007; 9 pages.
European Extended Search Report; Application No. 14176676.6; Sep. 30, 2014; 4 pages.
European Examination Report; Application No. 14176676.6; Jun. 16, 2016; 3 pages.

* cited by examiner

MULTICAST CONTROL CHANNEL DESIGN

BACKGROUND

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B rather than a base station or other systems and devices that are more highly evolved than the equivalent equipment in a traditional wireless telecommunications system. Such or next generation advanced equipment may be referred to herein as long-term evolution (LTE) equipment. Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

A group of LTE-based cells might be under the control of a single entity known as a central control. The central control typically manages and coordinates certain activities with a group of cells such as the scheduling for the transmissions. The modulation and coding schemes might include binary phase-shift keying (BPSK), quadrature phase-shift keying (QPSK), quadrature amplitude modulation (QAM), or other schemes that will be familiar to one of skill in the art.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

The transmission of an MBMS can include two components, a multicast control channel (MCCH) and a multicast traffic channel (MTCH). The MTCH delivers the actual content of the MBMS while the MCCH delivers control information related to the MBMS. The MCCH might include key control information that specifies how the content in the MTCH is to be delivered.

When multiple cells overlap, a UE within the overlapped region can receive transmissions from multiple base stations. It is well known in the art that when a UE receives substantially identical data from a plurality of base stations, the transmissions from the base stations can augment one another to provide a signal of significantly higher quality than would be the case if only one base station were transmitting the signal. That is, a higher signal-to-noise ratio can be achieved when substantially the same data is transmitted at substantially the same time on substantially the same resource as well as the same modulation and coding. A region in which a plurality of substantially identical signals are present is known as a single frequency network, or SFN. In the case where all of the base stations in a service area are transmitting an MBMS with substantially signals, the service area would be an SFN. However, if the base stations were transmitting the MBMS with different signals, for example, on different resource, the service area would not be an SFN.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system for providing a multicast control channel (MCCH) including information related to a service is provided. The system includes a processor programmed to promote transmission of a MCCH including a multi-cell information portion that contains information common to a plurality of cells in a wireless telecommunications network, and a cell-specific information portion that contains information specific to one of the cells.

In another embodiment, a method for providing control information is provided. The method includes transmitting a multicast control channel (MCCH) including information related to a service, wherein the MCCH has a cell-specific portion that contains information specific to a specific cell in a telecommunications network, and wherein the MCCH has a multi-cell portion that contains information common to a plurality of cells in the telecommunications network.

In another embodiment, a system for transmitting channel information is provided. The system includes a central control in a wireless telecommunications network. The central control has a processor configured to promote a plurality of cells transmitting a multicast control channel (MCCH). The MCCH includes a multi-cell information portion that contains information common to the plurality of cells in the wireless telecommunications network, and a cell-specific information portion that contains information specific to only one of the cells.

Figure 1:
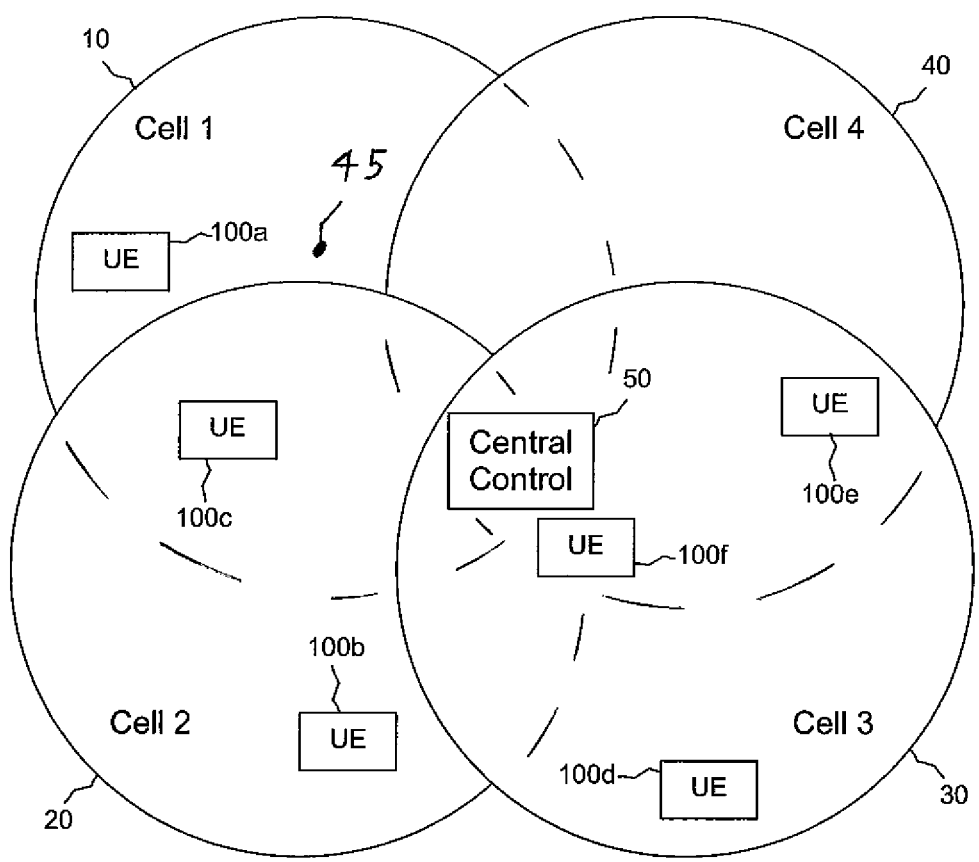
FIG. 1 is an illustration of a group of cells according to an embodiment of the disclosure.

FIG. 1 illustrates a geographic region covered by a plurality of cells. One or more UEs are present in each of the cells. UE 100*a* is in a region covered only by Cell 1 10. Cell 2 20 contains a UE 100*b* that is not covered by any other cell and a UE 100*c* that is also covered by cell 1 10. Cell 3 30 contains a UE 100*d* that is not covered by any other cell, a UE 100*e* that is also covered by cell 4 40, and a UE 100*f* that is also covered by cell 2 20 and cell 4 40. A central control 50 oversees the wireless data transmissions within the cells 10, 20, 30, and 40. The central control 50 or central controller may provide centralized management and coordination for a plurality of cells and their corresponding enhanced node Bs. It should be recognized that numerous other arrangements of these components are possible. For example, a different number of cells could be managed by the central control 50, the cells could be of different sizes and could overlap in different ways, a different number of UEs could be present in different locations within the cells, and so on.

Each of the cells 10, 20, 30, and 40 might be transmitting one or more MBMS services throughout its region of coverage. In the present disclosure, the cellular systems or cells are described as engaged in certain activities, such as transmitting signals; however, as will be readily apparent of one skilled in the art, these activities would in fact be conducted by components comprising the cells such as, for example, an enhanced node B 45 at each cell location promoting the transmission, such as via a transmitters and other well known equipment. Although only one enhanced node B 45 is shown, one skilled in the art would understand that each of the other cells 20, 30, 40 would include similar equipment. For example, cell 1 10 might be transmitting a first MBMS, a third MBMS, and a fourth MBMS. Cell 2 20 might be transmitting a second MBMS, the third MBMS, and the fourth MBMS. Cell 3 30 might be transmitting the first MBMS, the third MBMS, and the fourth MBMS as is cell 1 10. Cell 4 40 might be transmitting only the second MBMS and the third MBMS. Traditionally, each of the cells 10, 20, 30, and 40 would transmit a different MCCH to deliver control information for the MBMS services it was providing. That is, the MCCH transmitted by cell 1 10 would contain data specific to the services provided by cell 1 10, the MCCH transmitted by cell 2 20 would contain data specific to the services provided by cell 2 20, and so on. Each MCCH would be generated without regard to any other MCCHs that might be generated for other cells under the same central control.

In an embodiment, an MCCH is organized into two portions: a first portion contains information that is specific to a single cell and a second portion contains information that might be common to a plurality of cells. When a plurality of cells under the control of a single central control transmit the same MBMS, the central control can organize the common portions of the MCCHs transmitted by the cells such that control information related to the common MBMS is transmitted substantially simultaneously by each cell. Transmission of similar portions of the MCCHs at substantially the same time allows those portions to be transmitted with a higher quality, as is the case with an SFN.

Figure 2:
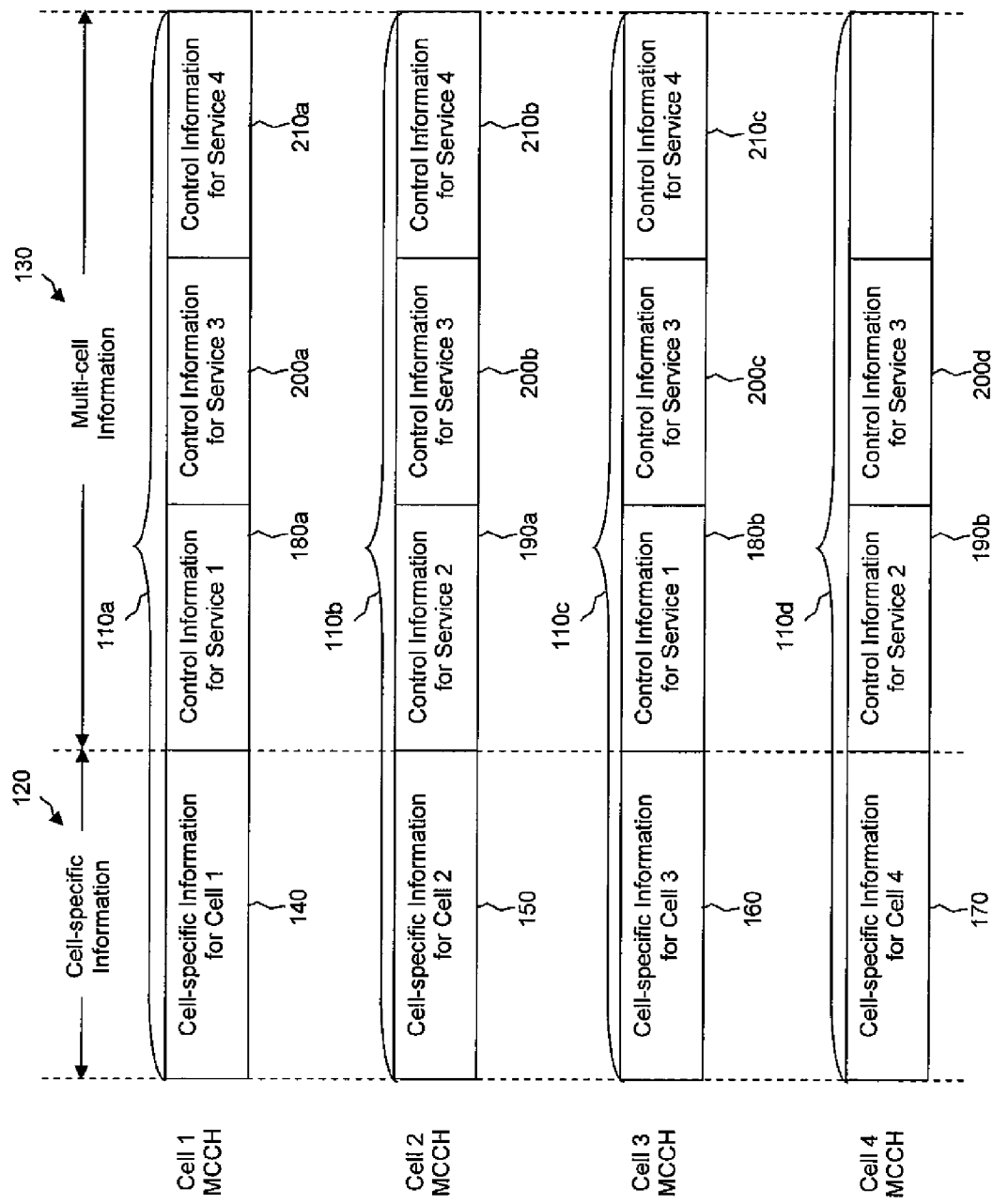
FIG. 2 is an illustration of a plurality of multicast control channels according to an embodiment of the disclosure.

FIG. 2 illustrates an embodiment of a plurality of MCCHs 110 organized into two portions in this manner. The MCCHs 110 might contain control information for MBMS services transmitted by cells such as the cells 10, 20, 30, and 40 of FIG. 1. That is, a first MCCH 110*a* might be transmitted in cell 1 10, a second MCCH 110*b* might be transmitted in cell 2 20, a third MCCH 110*c* might be transmitted in cell 3 30, and a fourth MCCH 110*d* might be transmitted in cell 4 40. Each MCCH 110 contains a portion 120 of cell-specific information and a portion 130 of multi-cell information. The cell-specific information might be different for each cell and the multi-cell information might contain information that is common to multiple cells.

For example, the cell specific information 140 for cell 1 10, the cell specific information 150 for cell 2 20, the cell specific information 160 for cell 3 30, and the cell specific information 170 for cell 4 40 might all be different from one another. The cell-specific information portion 120 of each MCCH 110 might contain modulation and coding data for the multi-cell information portion 130 of each MCCH 110 and other cell-specific data as described below.

As in the example given above, a first MBMS, or service 1, might be provided in cell 1 10 and cell 3 30; a second MBMS, or service 2, might be provided in cell 2 20 and cell 4 40; a third MBMS, or service 3, might be provided in cell 1 10, cell 2 20, cell 3 30, and cell 4 40; and a fourth MBMS, or service 4, might be provided in cell 1 10, cell 2 20, and cell 3 30. In an embodiment, control information for each of these services is placed in the multi-cell information portion 130 of the MCCHs 110. Control information for a particular service is given the same scheduling, the same modulation and coding and other formatting parameters in each MCCH 110 in which the control information appears. Control information that applies to a plurality of MCCHs 110 is then placed in substantially the same location and the same resource within each MCCH 110 to which the control information applies. Although certain information is described as located or placed or otherwise indicted has having a select site or spot in the MCCH, it will be readily apparent to one skilled in the art that such location, placement, or other similar description may not relate to a physical location of the information, but instead may indicate a time or frequency or combination of time and frequency of the information related to the MCCH.

This is illustrated in FIG. 2, where control information 180*a* for service 1 in MCCH 110*a* has been given a format substantially identical to control information 180*b* for service 1 in MCCH 110*c* and control information 180*a* and control information 180*b* have been placed in a first slot within the multi-cell information portion 130 of the MCCHs 110. Similarly, control information 210*a* for service 4 in MCCH 110*a*, control information 210*b* for service 4 in MCCH 110*b*, and control information 210*c* for service 4 in MCCH 110*c* have been given substantially identical formats and have been placed in a third slot within the multi-cell information portion 130 of the MCCHs 110. Similar considerations would apply to control information 190 for service 2 and control information 200 for service 3. As will be discussed below in further detail, the control information for a service is used by the UE to obtain the MTCH to receive the service.

Since control information 180*a* and control information 180*b* contain substantially the same information and are transmitted at substantially the same time on the same resource, these portions of MCCH 110*a* and MCCH 110*c* can augment each other to provide a higher signal-to-noise ratio than would be the case if either of those portions were transmitted alone independently such as on different resource or with different modulation and coding. Similar increases in signal-to-noise ratio would apply to control information 190*a* and control information 190*b*, to control information 200*a*, control information 200*b*, control information 200c, and control information 200d, and to control information 210a, control information 210b, and control information 210c.

It is well known that the greater the number of cells transmitting substantially identical information in the same region, the greater the signal-to-noise ratio of that information will be. Therefore, control information 210, which is being transmitted in three cells, might generally be considered to have a greater signal-to-noise ratio than either control information 180 or control information 190, each of which is being transmitted in only two cells. Control information 200, which is being transmitted in four cells, may have a greater signal-to-noise ratio than control information 210. It is also well known that when a data transmission has a high signal-to-noise ratio, a modulation and coding scheme that allows for a faster data transmission rate can be used.

In an embodiment, the central control 50 specifies the modulation and coding schemes that will be used in the multi-cell information portion 130 of the MCCHs 110 based on the number of cells that are transmitting control information for each service under the control of the central control. For example, control information 180 and control information 190, which are being transmitted by only two cells each, might be transmitted with a modulation and coding scheme that requires a low data transmission rate. Control information 210, which is being transmitted by three cells, might be transmitted with a modulation and coding scheme that allows a higher data transmission rate. Control information 200, which is being transmitted by four cells, might be transmitted with a modulation and coding scheme that allows an even higher data transmission rate. For instance, control information 180 and control information 190 might be transmitted via BPSK, control information 210 might be transmitted via QPSK, and control information 200 might be transmitted via QAM. One of skill in the art will recognize other modulation and coding schemes that might be appropriate in these or other circumstances.

In an embodiment, the cell-specific information portion 120 of each MCCH specifies the locations of each piece of control information in its associated multi-cell information portion 130 and also specifies the modulation and coding scheme that is to be used by each piece of control information in its associated multi-cell information portion 130. For example, the cell-specific information 140 in MCCH 110a might specify that the control information 180a for service 1 can be found in the first slot of the multi-cell information portion 130, the control information 200a for service 3 can be found in the second slot of the multi-cell information portion 130, and the control information 210a for service 4 can be found in the third slot of the multi-cell information portion 130. The cell-specific information 140 for cell 1 might specify that the control information 180a should use a first modulation and coding scheme, the control information 200a should use a second modulation and coding scheme, and the control information 210a should use a third modulation and coding scheme. Similar information might be present in the cell-specific information for the other MCCHs.

In an embodiment, the central control 50 analyzes the cells and services that are under its control and determines, or may generate, the MCCHs 110 that are appropriate for those cells and services. That is, the central control 50 may determine each portion of control information and identify the appropriate slot for placement within the multi-cell information portion 130 of each MCCH 110. The central control 50 may also assign an appropriate modulation and coding scheme to each portion of control information within the multi-cell portion 130 of each MCCH 110. The central control 50, or each cell, may select or determine the cell-specific information portion 120 of each MCCH 110, such as the location and modulation and coding scheme of each piece of control information. The control information also includes an association of each MCCH 110 with the appropriate MTCH. The appropriate MCCHs 110 is then available to the appropriate cells for transmission by the cells.

When one of the UEs 100 receives one of the MCCHs 110, the UE 100 might first examine the cell-specific information portion 120 of the MCCH 110 to determine the location within the multi-cell information portion 130 of the control information for a desired MBMS. Upon finding the location of the desired control information, the UE 100 might then read the control information at that location to determine the control information for the desired service. Using this control information, the UE 100 might then receive the multimedia content contained in the MTCH associated with the MCCH 110.

Figure 3:
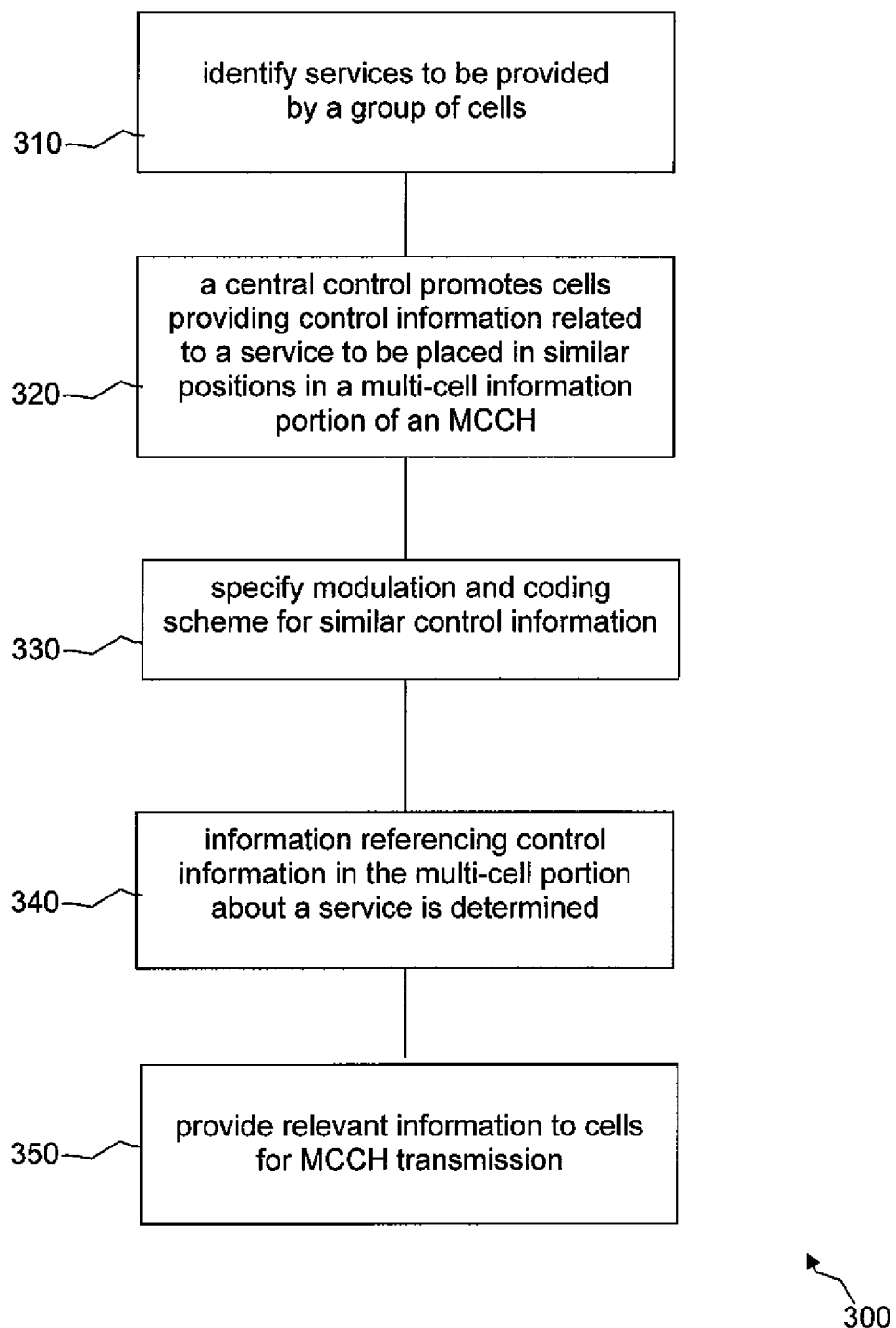
FIG. 3 is a diagram of a method for transmitting control information for a group of cells according to an embodiment of the disclosure.

FIG. 3 illustrates an embodiment of a method 300 for a group of cells to transmit control information. In block 310, the services that are to be provided by the cells under the control of a central control are identified. In block 320, the central control 50 promotes the cells providing control information in the same or similar position in the multi-cell information portion 130 of an MCCH for control information related to the same service. In block 330, the central control 50 promotes the cells providing the control information for the same service at the same or similar a modulation and coding schemes. In block 340, information referencing the control information in the multi-cell portion 130 about a service is determined. In block 350, the relevant information is provided to the cells for the MCCH transmissions. The equipment, such as an enhanced node B and transmitters, can then transmit the MCCH along with its associated MTCH so that the cells can provide the service.

Figure 4:
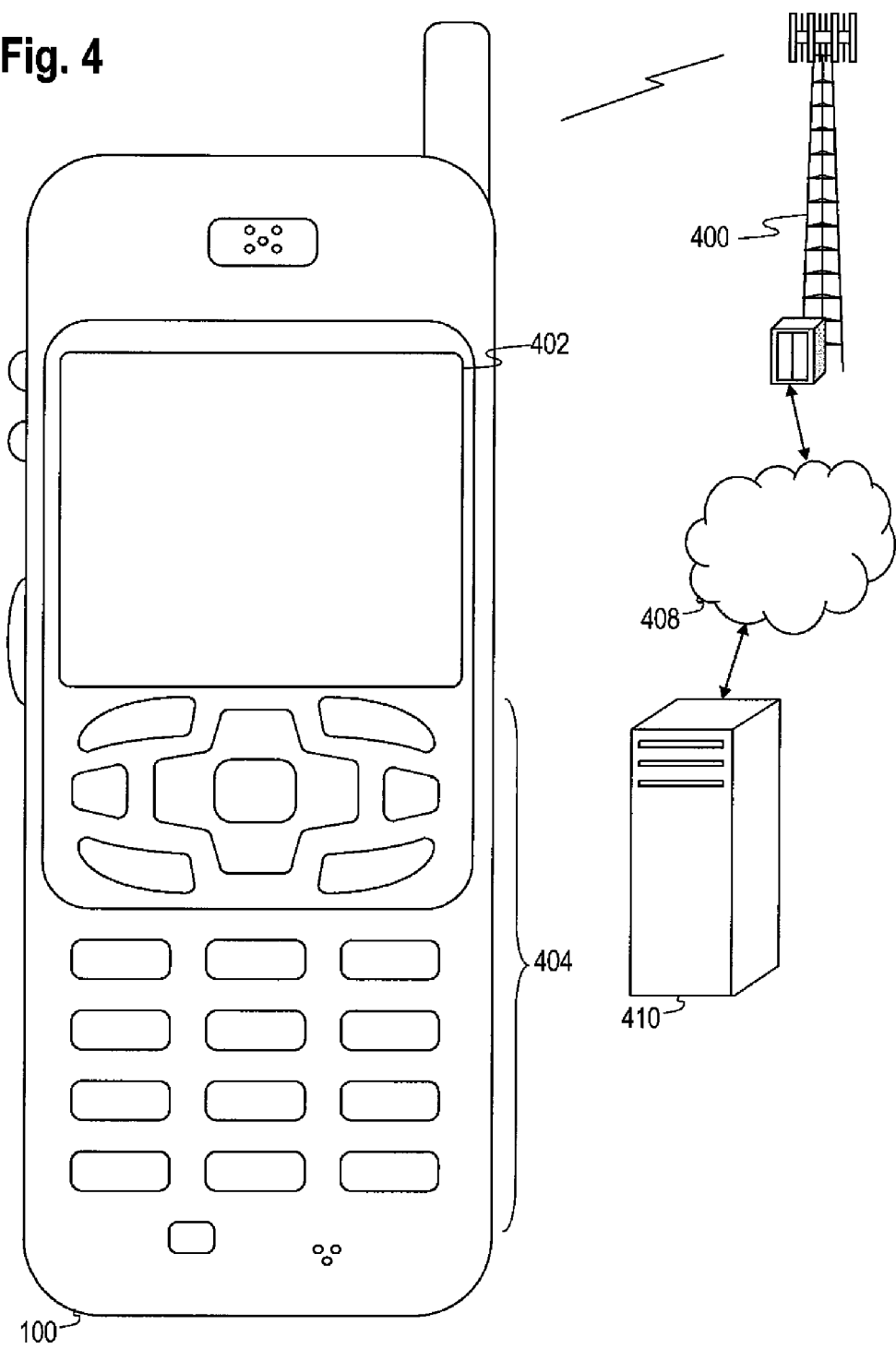
FIG. 4 is a diagram of a wireless communications system including user equipment operable for some of the various embodiments of the disclosure.

FIG. 4 illustrates a wireless communications system including an embodiment of one of the UEs 100. The UE 100 is operable for implementing aspects of the disclosure, but the disclosure should not be limited to these implementations. Though illustrated as a mobile phone, the UE 100 may take various forms including a wireless handset, a pager, a personal digital assistant (PDA), a portable computer, a tablet computer, or a laptop computer. Many suitable devices combine some or all of these functions. In some embodiments of the disclosure, the UE 100 is not a general purpose computing device like a portable, laptop or tablet computer, but rather is a special-purpose communications device such as a mobile phone, wireless handset, pager, or PDA. In another embodiment, the UE 100 may be a portable, laptop or other computing device.

The UE 100 includes a display 402. The UE 100 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 100 may present options for the user to select, controls for the user to actuate, and/or cursors or other indicators for the user to direct. The UE 100 may further accept data entry from the user, including numbers to dial or various parameter values for configuring the operation of the UE 100. The UE 100 may further execute one or more software or firmware applications in response to user commands. These applications may configure the UE 100 to perform various customized functions in response to user interaction.

Among the various applications executable by the UE 100 are a web browser, which enables the display 402 to show a web page. The web page is obtained via wireless communications with a wireless network access node, a cell tower, or any other wireless communication network or system 400. The network 400 is coupled to a wired network 408, such as the Internet. Via the wireless link and the wired network, the UE 100 has access to information on various servers, such as a server 410. The server 410 may provide content that may be shown on the display 402.

Figure 5:
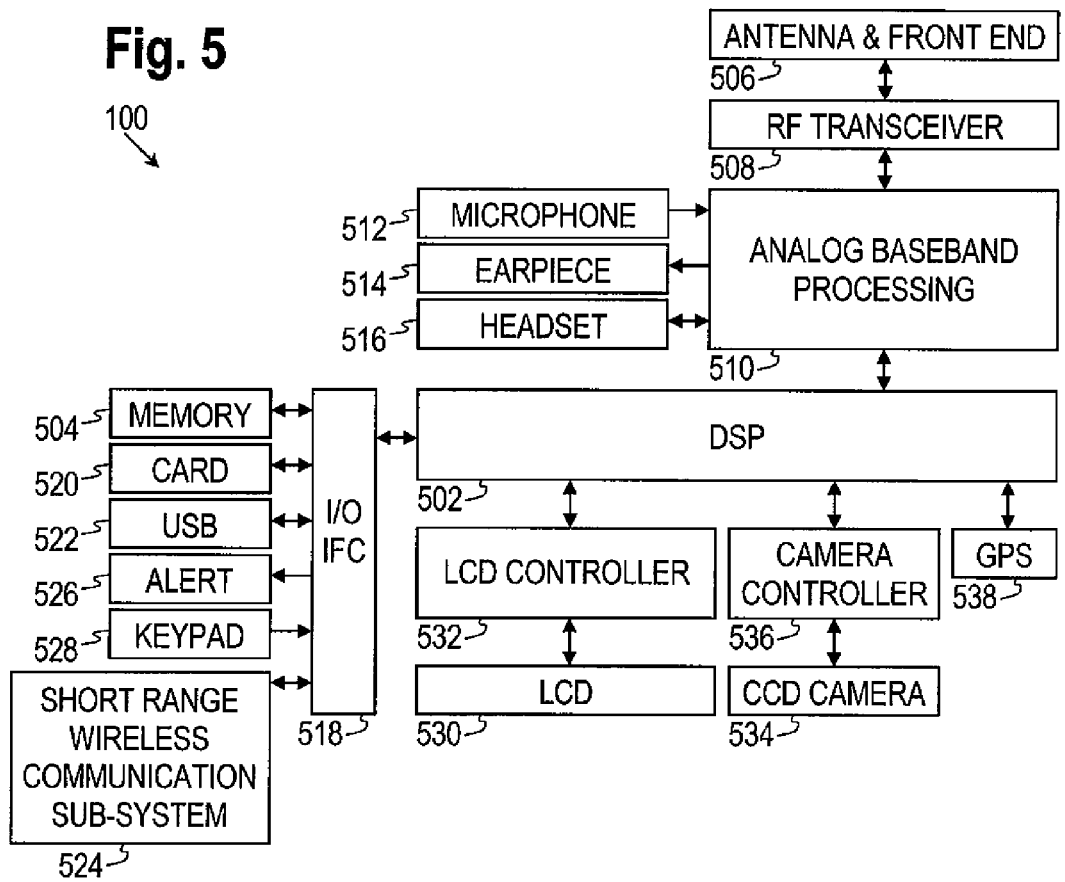
FIG. 5 is a block diagram of user equipment operable for some of the various embodiments of the disclosure.

FIG. 5 shows a block diagram of the UE 100. The UE 100 includes a digital signal processor (DSP) 502 and a memory 504. As shown, the UE 100 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the UE 100 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 100 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the UE 100 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 100 and may also enable the UE 100 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 100 to communicate wirelessly with other nearby mobile devices and/or wireless base stations.

The input/output interface 518 may further connect the DSP 502 to the alert 526 that, when triggered, causes the UE 100 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 100. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 100 to take digital pictures. The DSP 502 communicates with the CCD camera 534 via the camera controller 536. The GPS sensor 538 is coupled to the DSP 502 to decode global positioning system signals, thereby enabling the UE 100 to determine its position. Various other peripherals may also be included to provide additional functions, e.g., radio and television reception.

Figure 6:
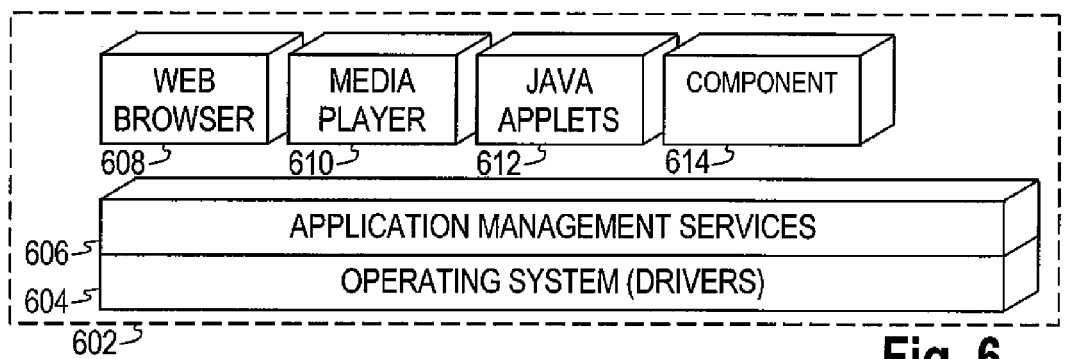
FIG. 6 is a diagram of a software environment that may be implemented on user equipment operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 100. Also shown in FIG. 6 are a web browser application 608, a media player application 610, and Java applets 612. The web browser application 608 configures the UE 100 to operate as a web browser, allowing a user to enter information into forms and select links to retrieve and view web pages. The media player application 610 configures the UE 100 to retrieve and play audio or audiovisual media. The Java applets 612 configure the UE 100 to provide games, utilities, and other functionality. A component 614 might provide functionality related to receiving and/or processing MCCH information.

Figure 7:
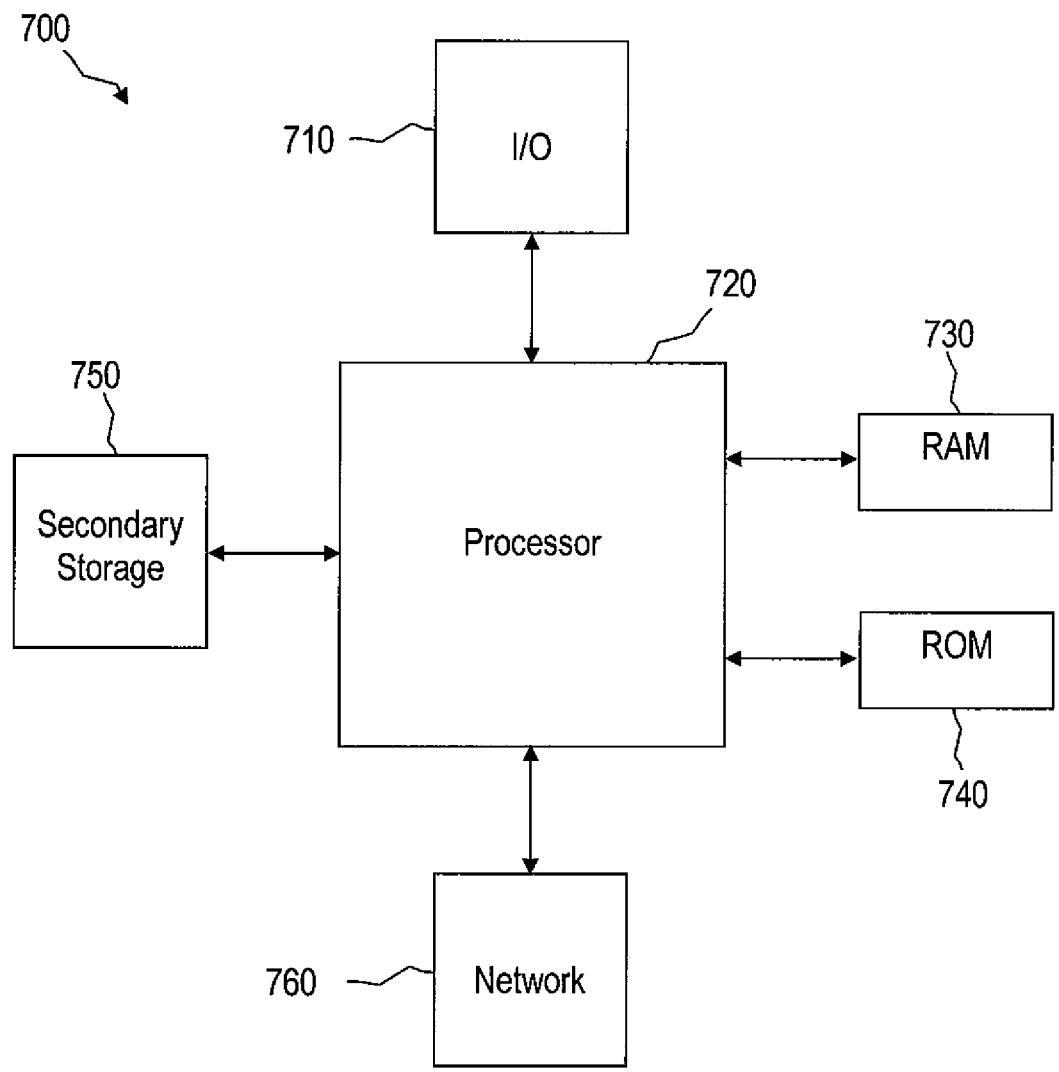
FIG. 7 is an illustrative general purpose computer system suitable for some of the various embodiments of the disclosure.

The central control 50 of FIG. 1 and other components that might be associated with the cells 10, 20, 30, and 40 may include any general-purpose computer with sufficient processing power, memory resources, and network throughput capability to handle the necessary workload placed upon it. FIG. 7 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for providing a multicast control channel (MCCH) having information related to a service in a wireless telecommunications network comprising a plurality of cells for providing common services, wherein the system comprises:
   a processor programmed to determine a modulation and coding scheme for at least one service to be provided by the plurality of cells, wherein the processor is further configured to promote transmission of a MCCH comprising:
   a multi-cell information portion that contains information common to at least two of the cells in the wireless telecommunications network; and
   a cell-specific information portion that contains information specific to one of the cells, wherein the cell-specific information portion contains at least one of:
      information related to scheduling information for the control information in the multi-cell information portion, and
      information related to modulation and coding information for the control information in the multi-cell information portion.

2. The system of claim 1, wherein the processor is a processor of an enhanced node B of a first cell of the wireless telecommunications network, and wherein the system further comprises:
   a central control of the wireless telecommunications network; and
   a second enhanced node B of a second cell of the wireless telecommunications network,
   wherein the central control is configured to identify a service and promote transmission by both the first and second cells of the MCCH having similar control information related to the service transmitted on a multi-cell information portion.

3. The system of claim 2, wherein the central control is further configured to promote both the first and second cells transmitting the similar control information related to the service at a same location in the multi-cell information portion of the MCCH and using a same radio resource.

4. The system of claim 2, wherein the central control is further configured to promote both the first and second cells transmitting the similar control information related to the service using a same modulation and coding scheme.

5. The system of claim 4, wherein using the same modulation and coding scheme further comprises:
the central control determining the modulation and coding.

6. The system of claim 1, wherein the system comprises an enhanced node B in the wireless telecommunications network, the wireless telecommunications network being a long-term evolution (LTE) network.

7. The system of claim 1, wherein the multi-cell information portion comprises a segment in which all multi-cell information is located, and wherein the cell-specific information comprises another segment in which all cell-specific information is located.

8. The system of claim 1, wherein the multi-cell information portion has control information related to services provided on a multicast traffic channel (MTCH), wherein the services are provided by the plurality of cells in the wireless telecommunications network, and wherein the processor is configured to select modulation and coding schemes for each one of the services based on a number of cells providing each respective service.

9. The system of claim 1, wherein the cell-specific information portion contains both information related to scheduling information for the control information in the multi-cell information portion, and information related to modulation and coding information for the control information in the multi-cell information portion.

10. A method for providing control information in a wireless telecommunications network comprising a plurality of cells for providing common services, wherein the method comprises:
transmitting a multicast control channel (MCCH) having information related to a service, wherein the MCCH has a cell-specific portion that contains information specific to a specific cell in a telecommunications network, and wherein the MCCH has a multi-cell portion that contains information common to at least two of the cells in the wireless telecommunications network; and
determining a modulation and coding scheme for at least one service to be provided by the plurality of cells;
wherein the cell-specific information portion contains at least one of:
information related to scheduling information for the control information in the multi-cell information portion, and
information related to modulation and coding information for the control information in the multi-cell information portion.

11. The method of claim 10, further comprising:
identifying the at least one service to be provided by the plurality of cells; and
determining a location within the multi-cell portion of the MCCH for the control information for the at least one service to be provided by the plurality of cells.

12. The method of claim 11, wherein the at least one service to be provided by the plurality of cells comprises a multimedia broadcast multicast service.

13. The method of claim 12, wherein determining the modulation and coding scheme is based on a number of cells providing the multimedia broadcast multicast service such that a higher data transmission rate is specified when a number of cells in the plurality of cells is higher and a lower data transmission rate is specified when the number of cells in the plurality of cells is lower.

14. The method of claim 10, further comprising:
identifying a first service to be provided by first and second cells of the plurality of cells;
determining to place at a first location within the multi-cell portion of the MCCH control information for the first service to be provided by the first and second cells;
identifying a second service to be provided by third and fourth cells of the plurality of cells; and
determining to place at a second a location within the multi-cell portion of the MCCH control information for the second service to be provided by the third and fourth cells, wherein the first and second services and first and second locations are different.

15. A non-transitory computer medium storing computer readable instructions executable by a processor of a computing device such that when executed, cause the computing device to implement a method for providing control information in a wireless telecommunications network comprising a plurality of cells for providing common services, the method comprising:
transmitting a multicast control channel (MCCH) having information related to a service, wherein the MCCH has a cell-specific portion that contains information specific to a specific cell in a telecommunications network, and wherein the MCCH has a multi-cell portion that contains information common to at least two of the cells in the wireless telecommunications network; and
determining a modulation and coding scheme for at least one service to be provided by the plurality of cells;
wherein the cell-specific information portion contains at least one of:
information related to scheduling information for the control information in the multi-cell information portion, and
information related to modulation and coding information for the control information in the multi-cell information portion.

16. The non-transitory computer medium of claim 15, the method further comprising:
identifying the at least one service to be provided by the plurality of cells; and
determining a location within the multi-cell portion of the MCCH for the control information for the at least one service to be provided by the plurality of cells.

17. The non-transitory computer medium of claim 16, wherein the at least one service to be provided by the plurality of cells comprises a multimedia broadcast multicast service.

18. The non-transitory computer medium of claim 17, wherein determining the modulation and coding scheme is based on a number of cells providing the multimedia broadcast multicast service such that a higher data transmission rate is specified when a number of cells in the plurality of cells is higher and a lower data transmission rate is specified when the number of cells in the plurality of cells is lower.

19. The non-transitory computer medium of claim 15, the method further comprising:
identifying a first service to be provided by first and second cells of the plurality of cells;
determining to place at a first location within the multi-cell portion of the MCCH control information for the first service to be provided by the first and second cells;
identifying a second service to be provided by third and fourth cells of the plurality of cells; and determining to place at a second location within the multi-cell portion of the MCCH control information for the second service to be provided by the third and fourth cells, wherein the first and second services and first and second locations are different.

\* \* \* \* \*